May 20, 1924.
F. P. BOYER
BRIDLE BIT
Filed June 11, 1921
1,494,884
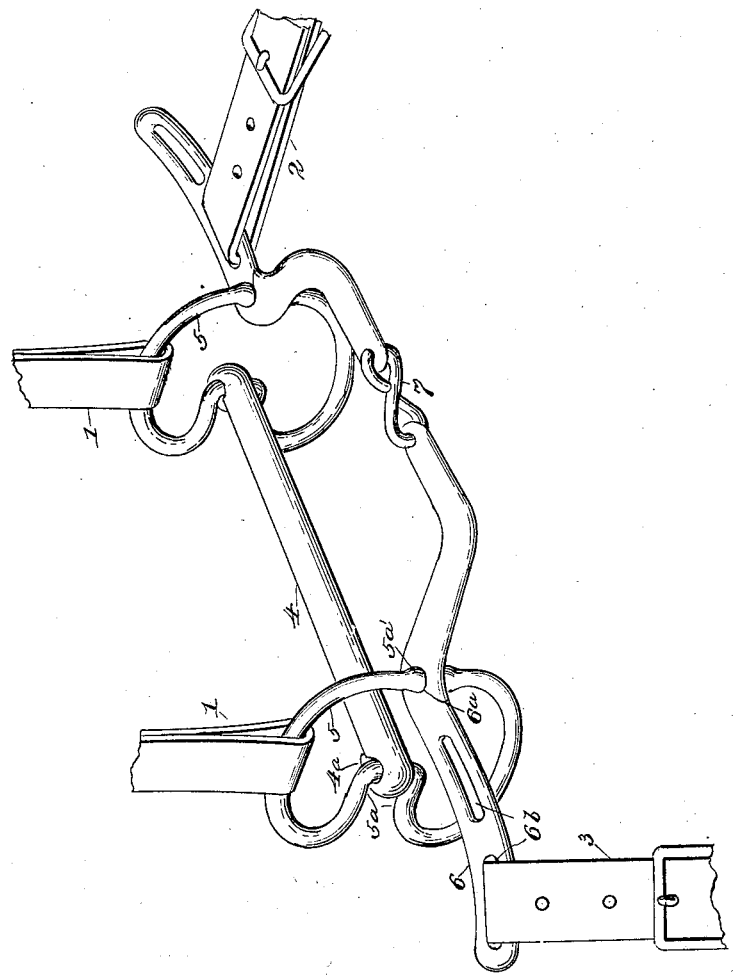
Inventor
Frank P. Boyer
By J. M. St. John
Atty.

Patented May 20, 1924.

1,494,884

UNITED STATES PATENT OFFICE.

FRANK P. BOYER, OF CENTRAL CITY, IOWA.

BRIDLE BIT.

Application filed June 11, 1921. Serial No. 476,806.

*To all whom it may concern:*

Be it known that I, FRANK P. BOYER, a citizen of the United States, residing at Central City, in the county of Linn and State of Iowa, have invented certain new and useful Improvements in Bridle Bits; and I do hereby declare the following to be a full, clear, and exact description of the invention, such as will enable others skilled in the art to which it appertains to make and use the same.

This invention relates more particularly to curb-bits for fractious or hard-bitted horses, and the object of the invention is to produce an improved bit which is adapted to restrain such horses without injury to their mouths, and without strain on the head-straps or other breakable parts of the bridle.

The invention is fully shown and described in the description and claim following, reference being had to the accompanying drawing in which a bit embodying the invention is shown in a single figure in perspective.

In the drawing, the numeral 1 denotes the head-strap of a bridle; 2 the outer rein, and 3 the inner rein of double harness.

The mouth-piece part of the bit, 4, may be a simple, straight bar suitably connecting with the side rings 5. The latter are most conveniently formed with reentrant loops 5ª, to which the ends of the bit-bar connect. The latter should be made of some suitable malleable material, and formed with open hooks 4ª which will admit the loops, and may then be closed thereon, but not so tightly as to prevent the rings from swinging sidewise. This construction makes the bit connection practically central to the rings, which project enough in each direction to prevent the bit from being drawn sidewise through the horse's mouth. To the rearward portions of the rings are pivoted curb-levers 6, held from displacement vertically by knobs 5ª′ formed in this portion of each ring. The levers should also be of malleable material, so that the open bearings 6ª may be closed after connecting with the rings, in the same manner as the bit-bar. The outer arms of the curb-levers are preferably provided with a plurality of slots 6ᵇ to allow for variation in the connection of the rein-straps according to circumstances. The outer slots being of course intended for harder-bitted animals than the inner ones. The other arms of the levers project inwardly, and are connected by a suitable link 7. Where the side-rings are made relatively as small as herein shown it is necessary to off-set these arms of the curb-levers, as shown, to give space between them and the bit-bar for the horse's lower jaw, otherwise this part of the lever might be straight.

It will be evident that when a hard pull is made on the reins, connected at the outer ends of the curb-levers, the connecting parts of the levers are brought to bear with a powerful, pinching pressure on the "chin," or back part of the animal's jaw. This is sufficient to bring him under control, but aside from a possible wounding of the skin by pressure, cannot do him any injury. The construction particularly avoids laceration of the horse's tongue, a characteristic of many types of curb-bits. It is also to be noted that none of the strain is brought to bear on the head-straps, which sometimes breaks them. Neither is the strain such as to draw the bit into the mouth, with its tendency to cut or tear the animal's lips.

Having thus described my invention, I claim:

In a bridle-bit, the combination of a bit-bar, connecting side-rings with rearwardly extending re-entrant loops pivoted to the ends of the bit-bar, and connecting curb-levers pivoted thereto back of the bit-bar, the rings being provided with knobs adjacent to the levers to hold them from vertical displacement.

In testimony whereof I affix my signature in presence of two witnesses.

FRANK P. BOYER.

Witnesses:
 EDITH ST. JOHN,
 D. L. WOOD.